(12) United States Patent
Neumann

(10) Patent No.: US 10,298,281 B2
(45) Date of Patent: May 21, 2019

(54) ESTABLISHING COMMUNICATION WITH WIRELESS DEVICES USING ORIENTATION DATA

(71) Applicant: NXP B.V., Eindhoven (NL)

(72) Inventor: Kai Neumann, Hamburg (DE)

(73) Assignee: NXP B. V., Eindhoven (NL)

( * ) Notice: Subject to any disclaimer, the term of this patent is extended or adjusted under 35 U.S.C. 154(b) by 0 days.

(21) Appl. No.: 14/706,544

(22) Filed: May 7, 2015

(65) Prior Publication Data

US 2016/0330779 A1 Nov. 10, 2016

(51) Int. Cl.
*H04W 24/00* (2009.01)
*H04B 1/3827* (2015.01)
*H04W 4/02* (2018.01)
*H04W 64/00* (2009.01)
*H04W 76/14* (2018.01)

(52) U.S. Cl.
CPC ............ *H04B 1/385* (2013.01); *H04W 4/026* (2013.01); *H04W 64/006* (2013.01); *H04W 76/14* (2018.02); *H04W 64/00* (2013.01)

(58) Field of Classification Search
CPC . H04W 76/023; H04W 4/026; H04W 64/006; H04W 4/02; H04W 64/00; H04W 4/025; H04W 40/20; H04W 48/04; H04W 76/14; H04B 1/385; H04B 17/318; H04M 1/72572; H04L 29/08657; G01C 21/20; G01S 5/0257; G01S 5/0289; G01S 5/0294; G01S 5/18
USPC ...... 455/457, 404.2, 414.2, 440, 456.1, 513, 455/115.3, 161.3, 226.2, 226.3, 277.2, 455/456.6
See application file for complete search history.

(56) References Cited

U.S. PATENT DOCUMENTS 8,260,324 B2 9/2012 Jantunen et al.
8,694,676 B2 4/2014 Sen et al.
(Continued)

FOREIGN PATENT DOCUMENTS

WO WO 2008152531 A1 12/2008

OTHER PUBLICATIONS

Xuan, et al., "Making Indoor Maps with Portable Accelerometer and Magnetometer", Ubiquitous Positioning Indoor Navigation and Location Based Service (UPINLBS) Oct. 14-15, 2010.
(Continued)

*Primary Examiner* — Kathy W Wang-Hurst
*Assistant Examiner* — B M M Hannan

(57) ABSTRACT

Aspects of the present disclosure are directed to methods, apparatuses and systems involving establishing communication with wireless devices. According to an example embodiment, a system comprises orientation circuitry configured and arranged to obtain orientation data indicative of a physical orientation of the user, a communication circuit configured and arranged to wirelessly communicate data with a plurality of wireless devices, and processor circuitry. The processor circuitry is configured and arranged to: determine a direction of interest using the orientation data, select a wireless device from the plurality wireless devices based on the direction of interest, the selection being based on information indicating a location of the user relative to the plurality of wireless devices, and establish communication between the system and the selected wireless device.

20 Claims, 4 Drawing Sheets

(56) References Cited

U.S. PATENT DOCUMENTS

| | | | | |
|---|---|---|---|---|
| 8,799,810 B1* | 8/2014 | Wheeler | | G06F 3/012 348/208.99 |
| 8,908,043 B2* | 12/2014 | Tricoukes | | G02B 27/017 348/14.02 |
| 8,973,078 B2* | 3/2015 | Nagara | | H04N 5/44513 725/131 |
| 2004/0119986 A1* | 6/2004 | Benke | | G01C 21/20 356/614 |
| 2009/0109241 A1* | 4/2009 | Tsujimoto | | H04N 7/18 345/633 |
| 2010/0069115 A1* | 3/2010 | Liu | | H04M 1/72569 455/556.1 |
| 2011/0083111 A1* | 4/2011 | Forutanpour | | G06F 1/1694 715/863 |
| 2012/0077437 A1* | 3/2012 | Agevik | | G01C 21/20 455/41.2 |
| 2012/0272158 A1* | 10/2012 | Weskamp | | H04W 4/023 715/748 |
| 2012/0315841 A1* | 12/2012 | Zhou | | H04B 7/2606 455/11.1 |
| 2013/0084805 A1* | 4/2013 | Pasquero | | G01C 17/32 455/41.2 |
| 2013/0222266 A1* | 8/2013 | Gardenfors | | G06F 3/1446 345/173 |
| 2013/0288603 A1* | 10/2013 | Iwasaki | | H04W 4/008 455/41.2 |
| 2014/0221017 A1* | 8/2014 | Jensen | | H04W 4/028 455/456.3 |
| 2014/0340284 A1* | 11/2014 | Kim | | G06F 3/14 345/2.3 |
| 2014/0378159 A1* | 12/2014 | Dolbakian | | H04W 64/006 455/456.1 |
| 2015/0094142 A1* | 4/2015 | Stafford | | G06F 3/04815 463/31 |
| 2015/0154769 A1* | 6/2015 | Anderson | | H04W 4/02 345/441 |
| 2015/0243078 A1* | 8/2015 | Watson | | G02B 27/017 345/547 |
| 2015/0261291 A1* | 9/2015 | Mikhailov | | G06F 3/012 345/156 |
| 2016/0071409 A1* | 3/2016 | Suomela | | H04R 1/1041 340/12.5 |
| 2016/0094936 A1* | 3/2016 | Yang | | H04Q 9/00 455/456.1 |
| 2016/0124707 A1* | 5/2016 | Ermilov | | G09B 21/006 345/156 |
| 2016/0139241 A1* | 5/2016 | Holz | | G01S 5/0289 367/128 |

OTHER PUBLICATIONS

Dahlgren, et al., "Evaluation of indoor positioning based on Bluetooth Smart technology", Master of Science Thesis in the Programme Computer Systems and Networks, Jun. 2014.
Extended European search report for EP patent application No. 16167278.7 dated Aug. 9, 2016.

* cited by examiner

ESTABLISHING COMMUNICATION WITH WIRELESS DEVICES USING ORIENTATION DATA

Aspects of various embodiments are directed to communication of data between a user device, such as a smartphone or tablet, and various wireless devices. For example, the wireless devices can include wireless (e.g., Bluetooth™) enabled Internet of Things (IoT) devices. IoT is a network of physical objects or "things" embedded with electronics, software, sensors and connectivity to add value and service by exchanging data with the manufacturer, operator, and/or other connected devices. A thing, in the IoT, can be a person with a heart monitor implant, a farm animal with a biochip transponder, a tire with a built-in sensor, or any other natural or man-made object that can be assigned an Internet Protocol (IP) address and provided with the ability to transfer data over a network. Each thing is identifiable through its embedded computing system and is able to interoperate within the existing Internet infrastructure. For example, data can be transferred over a network without requiring human-to-human or human-to-computer interaction. The wireless communication can include a short-wavelength communication, such as Bluetooth™ or Bluetooth™ low energy (BLE).

In many applications, a user can receive information on their device from the various wireless devices and/or can otherwise communicate with the various wireless devices. Such information can be pushed from the wireless device to the user device. If the user does not wish to receive the pushed information, the user can disable the communication with the various wireless devices.

These and other matters have presented challenges to establishing communication between a device and a selected wireless device, for a variety of applications.

Various example embodiments are directed to systems for use by a user and their implementation. According to an example embodiment, a system for use by a user comprises orientation circuitry, a communication circuit, and processor circuitry. The orientation circuitry is configured and arranged to obtain orientation data indicative of a physical orientation of the user and the communication circuit is configured and arranged to wirelessly communicate data with a plurality of wireless devices. The processor circuitry configured and arranged to determine a direction of interest using the orientation data, select a wireless device from the plurality wireless devices based on the direction of interest, the selection being based on information indicating a location of the user relative to the plurality of wireless devices, and establish communication between the system and the selected wireless device.

According to another example embodiment, a system for use by a user comprises orientation circuitry, location circuitry, a communication circuit, and processor circuitry. The orientation circuitry is configured and arranged to obtain orientation data indicative of a physical orientation of the user, the location circuitry is configured and arranged to obtain location data indicative of a location of the user, and the communication circuit configured and arranged to wirelessly communicate data with a plurality of wireless devices. The processor circuitry is configured and arranged to process the orientation data and the location data and to:

determine the location of the user relative to the plurality of wireless devices based on wireless signals received by the processor circuitry from the plurality of wireless devices and the location data, determine a direction of interest using the orientation data, select a wireless device from the plurality of wireless devices based on the direction of interest, the selection being based on the location of the user relative to the plurality of wireless device, and establish communication between the system and the selected wireless device.

A further example embodiments includes a method of selecting a wireless device to establish communication with a system, the system for user by a user. The method includes obtaining orientation data, using orientation circuitry, indicative of a physical orientation of the user, obtaining location data, using location circuitry, indicative of a location of the user using a system, the system including processor circuitry and a communication circuit, and generating, using the processor circuitry, a location map of a plurality of wireless devices relative to at least one location of the user based on signal strengths of wireless signals received from the plurality of wireless devices and the location data. The method further includes determining, using the processor circuitry: a direction of interest using the orientation data, a subset of the plurality of wireless devices within a zone, the zone being based on the direction of interest and at least one direction of interest parameter, and a distance of the user from the subset of the plurality of wireless devices using the location map. The method further includes selecting, using the processor circuitry, a wireless device among the subset of wireless devices based on the distance of the user from the subset of the plurality of wireless devices, and establishing communication with the selected wireless device using the system.

The above discussion/summary is not intended to describe each embodiment or every implementation of the present disclosure. The figures and detailed description that follow also exemplify various embodiments.

Various example embodiments may be more completely understood in consideration of the following detailed description and in connection with the accompanying drawings, in which.

Figure 1:
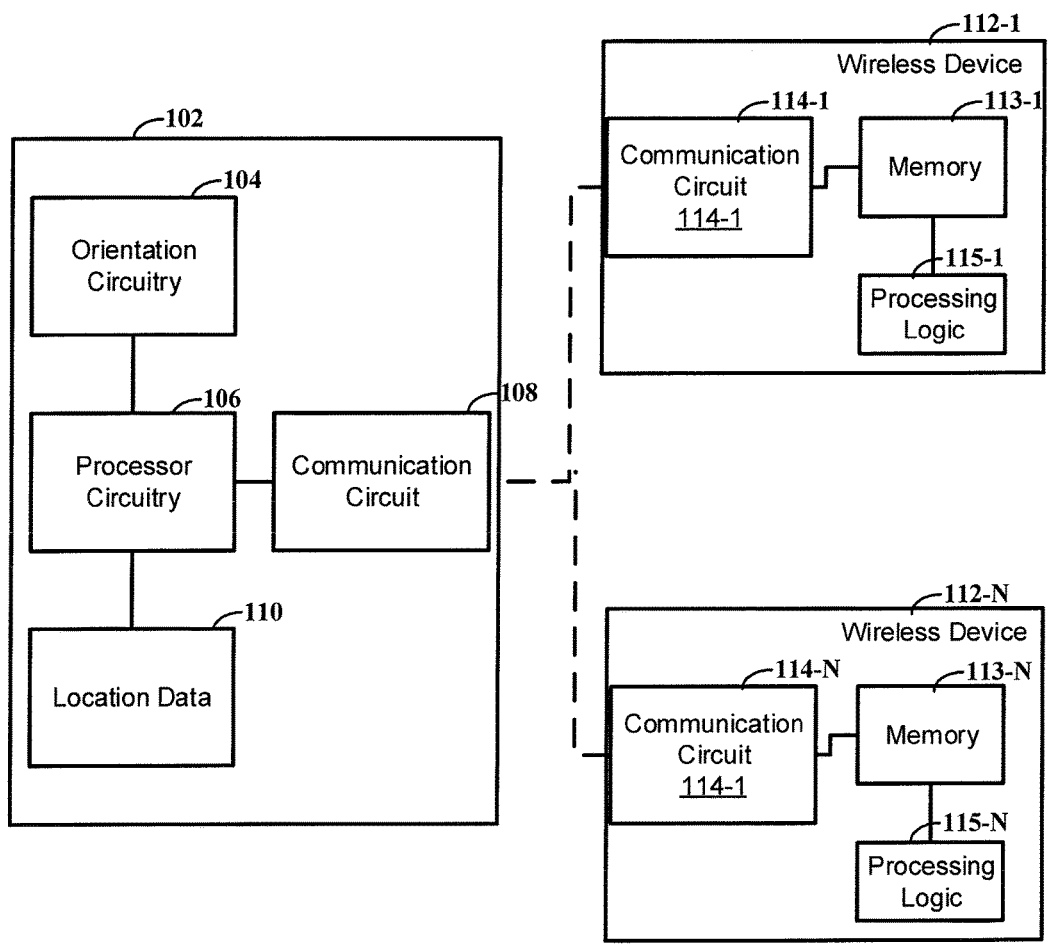
FIG. 1 shows a block diagram of an example system and a plurality of wireless devices, in accordance with various embodiments.

While various embodiments discussed herein are amenable to modifications and alternative forms, aspects thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the disclosure including aspects defined in the claims. In addition, the term "example" as may be used throughout this application is by way of illustration, and not limitation.

Aspects of the present disclosure are believed to be applicable to a variety of different types of devices, systems, and methods involving using a direction of interest of a user to select a wireless device to establish communication with. In certain implementations, aspects of the present disclosure have been shown to be beneficial when used in the context of a wearable device used to obtain orientation data indicating a physical orientation of the user. Using these approaches, wireless devices in the general area of the user can be selected based on the direction of interest to establish communication with minimal user interaction. By selecting wireless devices based on the direction of interest, a user may interact with wireless devices that are relevant to the user and/or may avoid receiving too much information from wireless devices in the area. Further, when used in context with a wearable device, the direction of interest can be obtained without further action from the user. While not necessarily so limited, various aspects may be appreciated through a discussion of examples using such exemplary contexts.

In various instances, information can be sent to a user device from other wireless devices. The information can be automatically pushed and/or the user can actively agree to receive information from particular wireless devices. For instance, the wireless devices can include IoT devices that push information to a user device. The user, due to the number of wireless devices in the area, may receive an amount of information that is undesirable. As a result, a user may turn off the push information feature resulting in receiving no information from IoT devices. Alternatively, the user may manually select which wireless devices to establish communication with. As the manual process is performed for each set of wireless devices, the user may perform the manual process each time the set of wireless devices changes. For instance, when the user moves locations, additional wireless devices may be in the new location.

By contrast, embodiments in accordance with the present disclosure are directed to a simplified interaction for establishing communication between the user device and a selected wireless device. A direction of interest can be determined using orientation circuitry and processor circuitry. The orientation circuitry, such as a compass, can be located on the user device and the user can direct the user device towards the area they are interested in. Alternatively, the orientation circuitry can be located on a wearable device that communicates with the user device, in a wireless or wired manner. The wearable device can be automatically directed towards the direction the user is looking, such as headphones and/or eye glasses. In such embodiments, the direction of interest can be indicative of the field of view of the user. Using the direction of interest, the device can automatically select a wireless device among a plurality of wireless devices in the area to establish communication with. The established communication can include receiving push information from the selected wireless device and/or controlling the selected wireless device. The direction of interest, in various embodiments, can be user configurable. That is, the user can adjust the direction of interest.

According to various example embodiments, aspects of the present disclosure are directed to IoT and/or other smart devices. For example, the user device can establish communication with particular wireless IoT devices in an area (e.g., a zone) based on a direction of interest. In this manner, information can be pushed to the user device from a wireless IoT device that is within the area that is based on the direction of interest and may not be pushed from wireless IoT devices that are outside the area. The particular wireless IoT device can be selected without manual input from the user and based on orientation data. If there are many IoT devices located in a particular location, the user may not become overwhelmed by push information as particular devices are automatically selected for communication. The user can, thereby, limit data received without turning off the push information feature.

Furthermore, in various embodiments, particular smart devices can be selected for a communication session. For example, a user may have a number of smart devices in their home that can be controlled using the user device. However, manually selecting which smart device to control can be time consuming and frustrating to a user. To ease the user's experience, the user device can establish a communication session with a particular smart device that is within an area based on the direction of interest. The direction of interest can be automatically set based on where the user is looking using a wearable device. Alternatively, the user can set the direction of interest based on an orientation of the user device. Once a communication session is established, the user can control operation of the selected smart device using the user device. For example, the user can change a volume or channel of a smart television, turn lights on or off, set a temperature of a smart thermostat, etc., using their device.

Turning now to the figures, FIG. 1 shows a block diagram of an example system 102 and a plurality of wireless devices, in accordance with various embodiment. The system 102, in various embodiments, can establish communication with one or more of the wireless devices 112-1, 112-N (herein after generally referred to as the "wireless devices 112" for ease of reference). For example, the system 102 and the wireless devices 112 can communicate using a wireless communication, such as Bluetooth or BLE.

The system 102, in various embodiments, can include a user device. A user device can include a mobile device, such as a smartphone, a tablet, a laptop computer, and a wearable device. In various embodiments, the system 102 can include multiple user devices. That is, the components of the system 102 illustrated by FIG. 1 can be located in a housing of a user device. Alternatively, a first subset of the components of the system 102 can be located in a housing of a first user device and a second subset of the components of the system 102 can be located in a housing of a second user device. The first user device and the second user device can be in communication in a wireless or wired manner.

As previously discussed, the wireless devices 112 can include IoT devices that can push information to the system 102. Pushing information, as used herein, can include a communication of data where the request for the transaction is initiated by the publisher and/or a central server. By contrast, pulling information is where the request for the transaction is initiated by the receiver and/or the client. The information can include notifications, information about products, sale information, warranty information, system status information (e.g., temperature), among various other information. Alternatively and/or in addition, the wireless devices 112 can include smart devices that can be controlled and/or operated using the system 102. In various embodiments, an area can include a vast number of wireless devices 112. If each of the wireless devices sends information to the system 102, the user may be overwhelmed.

In accordance with various embodiments, the system 102 can select one of the wireless devices 112 to establish communication with. For example, a direction of interest can be determined using orientation circuitry 104 and processor circuitry 106. The orientation circuitry 104 can be located on a user device of the system 102 and the user can direct the user device towards the area they are interested in.

Alternatively, the orientation circuitry 104 can be located on a wearable device that communicates with the user device, in a wireless or wired manner. The wearable device can include a device that is worn and is automatically directed towards the direction the user is looking at, such as headphones and/or eye glasses. In such embodiments, the direction of interest can be indicative of the field of view of the user. Using the direction of interest, the system 102 can automatically select a wireless device from the wireless devices 112 in the area to establish communication with. The established communication can include receiving push information from the selected wireless device and/or controlling operation of the selected wireless device.

As illustrated by FIG. 1, the system 102 can include orientation circuitry 104 and processor circuitry 106. The orientation circuitry 104 can obtain orientation data indicative of a physical orientation of the user. Obtaining data, as used herein, can include determining and/or measuring the respective data. The orientation data can include a direction, such as north, south, east, and west, and up, down. In various embodiments, the orientation circuitry 104 can include at least one selected from the group consisting of a compass, a gyroscope, a gyrocompass, a magnetometer, an optical sensor (e.g., a camera or other sensor), and a combination thereof. For example, in some embodiments, the orientation circuitry 104 can include a compass and a gyroscope. The compass can obtain orientation data and the gyroscope can obtain further orientation data. The processor circuitry 106 can determine a direction of interest based on the orientation data and/or the further orientation data.

In various embodiments, the system includes a communication circuit 108 configured to wirelessly communicate data with the plurality of wireless devices 112. In various embodiments, the processor circuitry 106 can include a microcontroller (e.g., a low power microcontroller). The communication circuit 108 can be configured to communicate using BLE, in various embodiments.

The processor circuitry 106, in some embodiments, can process the orientation data. For example, the processor circuitry 106 can determine a direction of interest using the orientation data. Further, the processor circuitry 106 can select a wireless device from the plurality of wireless devices 112 using the direction of interest and based on information indicating a location of the user relative to the plurality of wireless devices 112. The information can include location data 110. The location data 110, for example, can be input to the processor circuitry 106 from another device and/or can be determined by the processor circuitry 106, as discussed further herein. And, the processor circuitry 106 can establish communication between the system 102 and the selected wireless device.

The selected wireless device can be within a zone that is determined based on the direction of interest. For example, using the direction of interest, a zone can be determined. The zone can include an x, y, and z projection (e.g., an area) from the direction of interest. The distance of the x, y, and z projection that defines the zone can include direction of interest parameters. The direction of interest parameters can be predefined (e.g., set to a particular value) and/or configurable by the user (e.g., such as, by based on where the user directs the system to establish the direction of interest and/or user feedback). In this way, wireless devices that are not within the zone can be automatically disregarded by the system 102 for further communication. Further, if multiple wireless devices are within the zone, the selected wireless device can be located closer to the system 102 than other wireless devices that are within the zone.

In accordance with various embodiments, the zone can be user configurable. Said differently, the user can adjust the zone using various user inputs. In some embodiments, the adjustment can include an adjustment in an x, y, and z projection. For example, the user can provide user input to the system 102 to change the x, y and/or z projection to be lower or greater than the current zone is (e.g., change from teen feet to five feet). Thereby, the user can adjust the volume of space that is included in the zone.

In some embodiments, the adjustment can be related to particular wireless devices. For example, the user can be presented with a list of wireless devices in the zone and the user can provide an indication to not include a particular wireless device. Alternatively and/or in addition, the adjustment can be for a particular use. For example, the user can set particular direction of interest parameters for particular uses/areas (e.g., direction of interest parameters for controlling devices in living room of a home and different direction of interest parameters for controlling devices in a bedroom of the home).

As further illustrated by FIG. 1, each of the wireless devices 112 includes a communication circuit 114, processing logic 115, and memory 113. The communication circuits 114 can allow for wireless communication between the wireless devices 112 and the system 102. Further, in various embodiments, the communication circuits 114 can allow for the wireless devices 112 to communicate using the Internet, such as IoT devices. The processing logic 115 and/or memory 113 can be used to operate the wireless devices, connect to a network (e.g., an IoT and/or the Internet), store data, among other operations or functions.

In various embodiments, the location data 110 can be determined by the processor circuitry 106. For example, the location data 110 can include information indicating the location of the user relative to the plurality of wireless devices 112. The information can be determined, for example, using signals strengths of wireless signals received from the plurality of wireless devices. In various embodiments, the location data 110 includes distances of the plurality of wireless devices 112 from the user (e.g., the user that is using the system 102). The distances can be determined, using the processor circuitry 106, and based on signal strengths of wireless signals from the wireless devices 112 as received by the system 102.

In a number of embodiments, the location data 110 can be based on a location map. The location map can be input from another device and/or generated by the system 102. For example, in some embodiments, the system 102 can receive an initial location map from another device and can update the map, as discussed further herein. For example, the another device can include an external server and/or a cloud server. In various embodiments, when a user enters a location with the system 102, the system 102 can determine the location and download the location map from a server associated with the location, a wireless device and/or the system 102. As a particular example, a user can enter a grocery store with the system 102. The system 102 can recognize the location is the grocery store (e.g., through metadata sent to the system 102, such as from wireless device and/or a tag scanned by the system 102) and can download a location map of the grocery store from a device associated with the grocery store. Alternatively and/or in addition, the location map can be previously generated by the system 102 and can be stored by the system 102 (e.g., on memory) or an external device (e.g., a wireless device, a cloud server, and/or other external server). The system 102 can recognize that location, such as based on identifying a particular wireless device and/or a location of the user, can retrieve the location map from internal or external storage.

The location map can include indications of the wireless devices 112 (e.g., locations) in an area relative to one another and/or relative to at least one location of the user (e.g., that is using the system 102). In various embodiments, the processor circuitry 106 can identify each of the plurality of wireless devices 112 in an area when the user is at a first location and in response to receiving wireless signals from the wireless devices 112. The processor circuitry 106 can generate a location map of the plurality of wireless devices 112 relative to the first location of the user based on signal strengths of signals received from the plurality of wireless devices 112. The location map can include potential location areas of the wireless devices relative to the user that can be revised based on the user moving and measuring additional signal strengths.

For example, in some embodiments, the system 102 includes location circuitry configured and arranged to obtain the location data 110. The location circuitry can be located in the same housing as the processor circuitry 106 and/or, alternatively, can be located on another device in communication with the system 102. The location circuitry can obtain location data 110 relative to a location of the user. For example, the location data can be indicative of a location of the user relative to the plurality of wireless devices 112. In various embodiments, the location circuitry can include an accelerometer. The location data can be used by the processor circuitry 106 to further refine the location map. For example, the processor circuitry 106 can update the location map in response to the user moving from a first location to a second location with the system 102. The update can be based on signal strengths of wireless signals received from the plurality of wireless devices 112 at the second location and location data.

Although the embodiment of FIG. 1 illustrates the system as one device, embodiments are not so limited. For example, systems embodiments can include a first user device and a second user device in communication (e.g., a wireless or wired communication). The first user device can include a wearable device, such as headphones or smart glasses, that includes at least the orientation circuitry 104 and an additional communication circuit to communicate with the second user device (e.g., not illustrated by FIG. 1). The first user device can be worn and can be oriented in the direction of a field of view of the user. In such embodiments, the direction of interest can be the field of view of the user. The second user device can include the processor circuitry 106 and/or the location circuitry. The first user device, using the additional communication circuit, can communicate the orientation data to the second user device and the second user device can determine the direction of interest, select a wireless device, and establish communication with the selected wireless device. The second user device can include a mobile device, such as a smart phone, a tablet, a smartwatch, etc.

In various embodiments, the first user device includes the orientation circuitry 104 and a microphone. The additional communication circuit can communicate with the communication circuit 108 located on the second user device using a cable connected to the wireless device and/or wirelessly. The second user device, using the communication circuit 108, can communicate wirelessly with the wireless device 112 and can include the location circuitry and the processor circuitry 106. The user can provide user inputs to the first user device using voice commands and the microphone, for example. Alternatively, the first user device can include the orientation circuitry 104 and the location circuitry. Further, in a number of embodiments, the first user device includes the orientation circuitry 104, the location circuitry, and the processor circuitry 106. The first user device can communicate the various information, including a selected wireless device, to the second user device.

The system 102, in a number of embodiments, can include a user interface to communicate data with the user. For example, a display of the user interface can provide identification of the selected wireless device to the user. As previously discussed, the system 102 and/or the first user device can include a microphone, in various embodiments. For example, the user can start communication between the device and the selected wireless device using a user input. The user input can include voice commands, touch input on a display and/or keyboard, among other inputs. The established communication can include push information from the selected wireless device and/or controlling operation of the selected wireless device. In some embodiments, the information received can be displayed on the display of the system 102 and/or a list of operations that the user can control (e.g., available operations) can be displayed in a list on a display of the system 102.

Embodiments in accordance with the present disclosure include a simplified user interaction for establishing communication between the system 102 and a selected wireless device as compared to a manual process. Often particular areas contain a vast number of wireless devices capable of communicating with the system 102. If each of the wireless devices 112 in the area sends information to the system 102, the user may be overwhelmed. The user may, for example, turn off the automatic push of information and may not receive information that they would like to. In various embodiments, the user may manually select one or more of the wireless devices 112 to receive push information from and/or to control. The user can select the wireless device using a display, such as a touch display. However, this can be a time consuming process when a vast number of wireless devices 112 are present in the area. By contrast, embodiments in accordance with the present disclosure include a simplified interaction for establishing communication between the system 102 and a selected wireless device by determining a direction of the interest of the user. Wireless devices can be automatically selected by the system 102 as candidates for communication without and/or with minimal user interaction using the direction of interest.

In addition, the various embodiments described herein may be combined in certain embodiments, and various aspects of individual embodiments may be implemented as separate embodiments. For instance, aspects of FIG. 1 can be used in combination with aspects of FIGS. 2-4. For example, the system 102 illustrated by FIG. 1 can be used to perform the method illustrated by FIG. 4. Further, the system 102 of the FIG. 1 can include additional and/or fewer elements than illustrated by FIG. 1. For example, the system 102 can include two separate user devices in communication. The first user device can be a wearable device that includes orientation circuitry, a communication circuit, location circuitry, and/or a processor circuitry, or any combination thereof The second user device can include a mobile device that includes orientation circuitry, a communication circuit, location circuitry, and/or a processor circuitry, or any combination thereof The first and second user devices can be in communication, as previously discussed.

Figure 2:
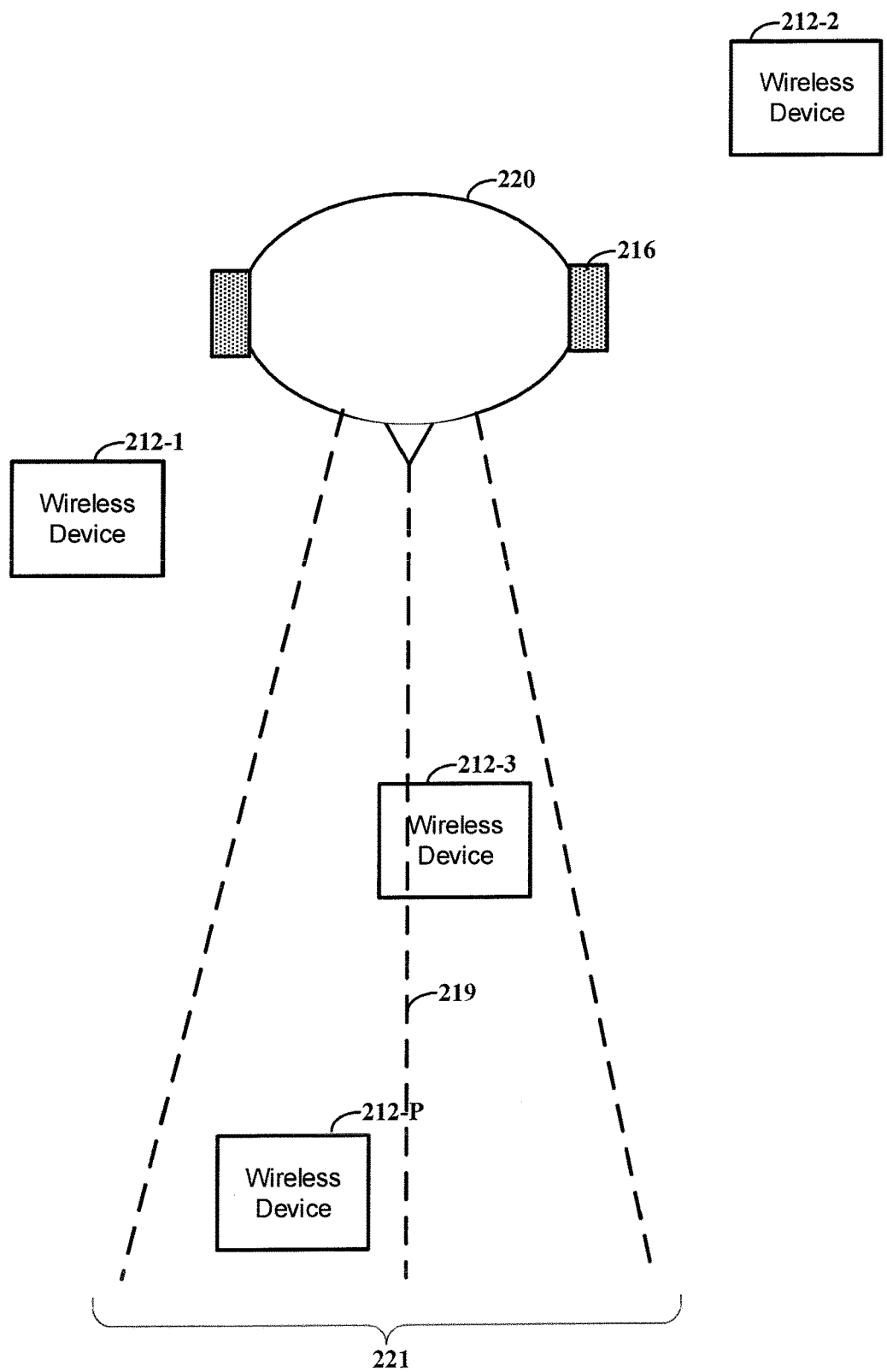
FIG. 2 shows an example of a direction of interest, in accordance with various embodiments.

FIG. 2 shows an example of a direction of interest 219, in accordance with one or more embodiments. As illustrated by FIG. 2, in various embodiments, a system can include a wearable device 216 that is worn on the user's 220 head. The wearable device 216 can be directed toward the field of view of the user 220. That is, as the user changes their field of view, the wearable device 216 changes a physical orientation. In such embodiments, the wearable device 216 can include at least orientation circuitry and a communication circuit. In various embodiments, the wearable device 216 can further include location circuitry and/or processor circuitry. The wearable device 216 can, in some embodiments, perform the various actions as described herein. Alternatively, the wearable device 216 can be in communication with another user device, such as a mobile device the user 220 is using.

For example, in various embodiments, the mobile device and the wearable device 216 can be in communication. The mobile device can include the processor circuitry, and in some embodiments, the location circuitry. The communication can include a wireless and/or a wired communication.

As illustrated by FIG. 2, the direction of interest 219 can be obtained from orientation data. The orientation data can include two or three-dimensional orientation data indicative of an orientation of the orientation circuitry located on the wearable device 216. For example, the three-dimensional orientation data can include an x, y, and z values. For example, the three-dimensional orientation data can be used to obtain the direction of interest 219.

In various embodiments, the direction of interest 219 can be used to determine a zone 221 based on direction of interest parameters. The direction of interest parameters, in some embodiments are an x, y, and z projection. For example, the x, y, and z projection can be pre-set and/or can be adjusted by the user 220. In some embodiments, the user may want a wider zone and can adjust the x projection to be bigger than previously set and/or can adjust for a particular use (e.g., when selecting wireless devices in the living room has a wider x projection than when selected wireless devices at a grocery store). Wireless devices that are within the zone 221 can be selected, in various embodiments, as previously discussed.

Although the zone 221 illustrated by FIG. 2 is linear, embodiments in accordance with the present disclosure are not so limited. For example, zones in accordance with the present disclosure can be asymmetrical (e.g., wider on a first side than a second side), can be elliptical, and/or various other shapes.

As further illustrated, some of the wireless devices 212-1, 212-2 may be outside the zone 221 that is based on the direction of interest 219 and at least one wireless device 212-3, 212-P can be within the zone 221, in some embodiments. In such embodiments, the closer wireless device 212-3 to the user 220 than other wireless devices 212-P that are also within the zone 221 can be selected. That is, the selection is based on the location of the wearable device 216 and the locations of the plurality of wireless devices 212.

Thereby, in some embodiments, a subset of the plurality of wireless devices 212 are within the zone 221. In such embodiments, the processor circuitry can determine a distance of the user from the subset of the plurality of wireless devices. The distance can be determined using the location map and/or based on signal strengths. Further, the processor circuitry can select a wireless device from the subset of wireless devices based on the distance of the device from the subset of wireless devices. The selected wireless device can have a smaller distance from the user than the remaining subset of wireless devices. In various embodiments, one of the remaining subset of wireless devices that are within the zone 221 with a larger distance from the user than the selected wireless device can be selected as an alternative candidate.

Figure 3:
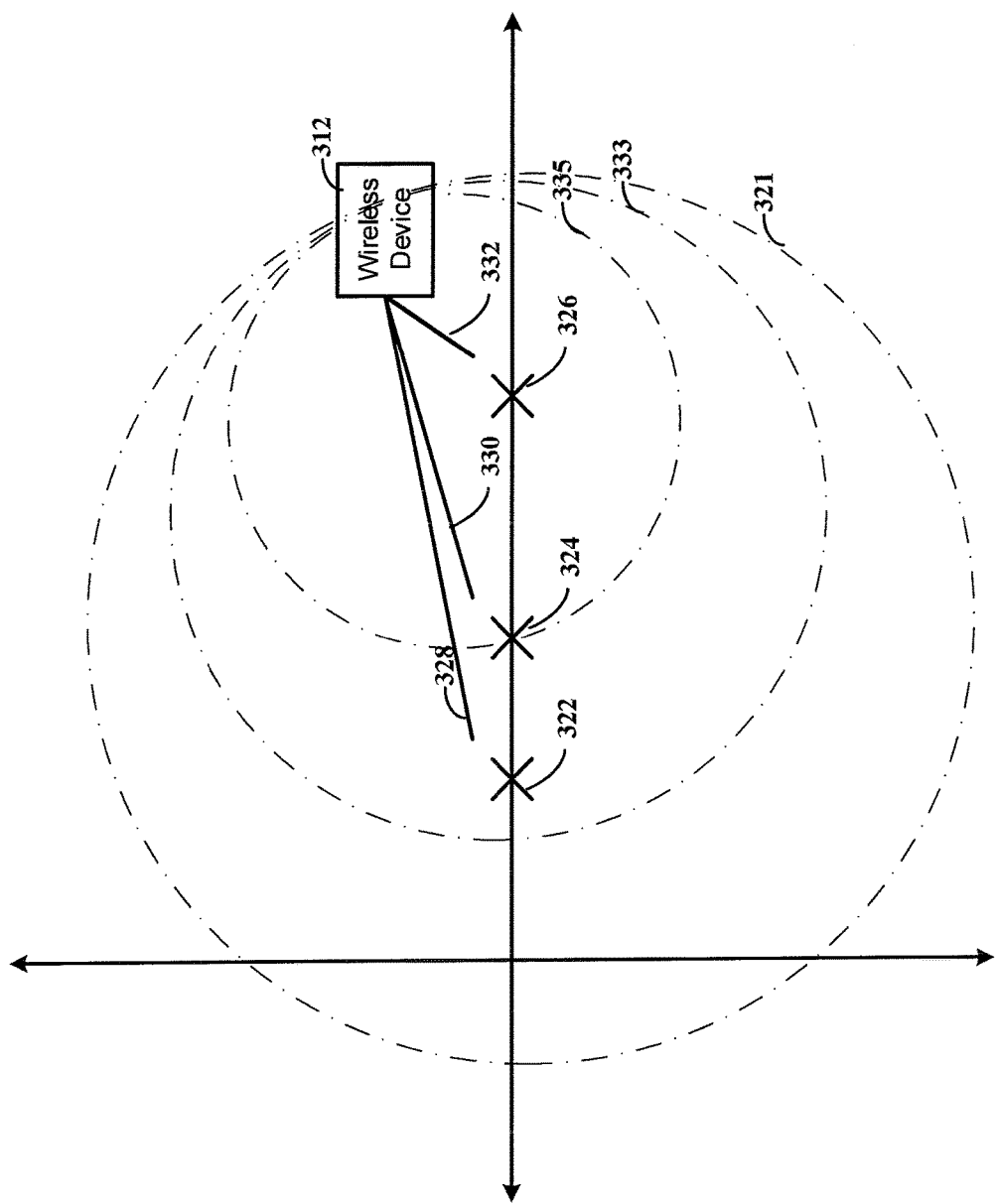
FIG. 3 shows an example of a graph for determining a location of a wireless device relative to a user, in accordance with various embodiments.

FIG. 3 shows an example of a graph for determining a location of a wireless device 312 relative to a user, in accordance with various embodiments. The graph, in various embodiments, can include a location map of a wireless device 312 relative to multiple locations 322, 324, 326 of the user.

The location of a wireless device 312 relative to a user can be determined using a number of techniques. For example, the location can be determined using triangulation techniques. Further the location can be determined by determining a best guess location based on signal strengths from wireless device. The best guess location can have a likelihood and the amount of tolerance can define a radius of the potential location area.

FIG. 3 illustrates a particular example of determining the location of the wireless device 312 relative to the user. For example, processor circuitry of a system and/or user device can be used to determine locations of the plurality of wireless devices relative to a location of the user based on wireless signals received by the processor circuitry from the plurality of wireless devices. In various embodiments, based on the location information, the processor circuitry can generate a location map of the locations of the plurality of wireless devices relative to at least one location of the user. The location map can be generated based on the signal strengths of wireless signals received from the wireless devices and location data obtained using location circuitry.

The location map can include a distance of the plurality of wireless devices relative to the user. For example, the location map illustrated by FIG. 3 shows a single wireless device 312 and a location determined using three locations 322, 324, 326 of the user that is using a user device. The distance can be based on a relative x, y, and z position of the user device and a signal strength of the received signals 328, 330, 332.

For example, the location map can be updated over time. The update can be in response to movement of the user. For instance, the location of the wireless devices can be known with a higher precision (e.g., the location has a higher likelihood of being accurate) after the movement than before. After three movements, for instance, the location map can be generated and the locations of the wireless devices relative to the user can be known with a likelihood that is above a threshold (e.g., a high likelihood).

As an example, the user can move in an x direction. At the first location 322, the user device can receive a first wireless signal 328 from the wireless device 312 in the area. The user device, in response to the first wireless signal 328, can recognize existence of the wireless device 312 in the area and can generate an initial location map. The initial location map can include a potential location area 321 of the wireless device 312. The potential location area 321 can include a radius around the first location 322 of the user that is based on the signal strength of the first wireless signal 328. As illustrated, the potential location area 321 of the wireless device 312 is not exactly known. The user may then move to a second location 324 and the user device may receive a second wireless signal 330 from the wireless device 312 while at the second location 324. In response to the second wireless signal 330, and based on signal strength and location data, the potential location area 333 of the wireless device 312 is updated. The updated potential location area 333 can have a higher precision than the potential location area 321. The user may then move to a third location 326 and the user device receives a third wireless signal 332 from the wireless device 312 while at the third location 326. Based on the signal strength of the third wireless signal 332 and location data, the potential location area 335 of the wireless devices 312 is further updated. The further updated potential location area 335 can have a higher precision than the potential location area 321 and the updated potential location area 333 of the wireless device 312.

In various embodiments, the potential location areas 321, 333, 335 are used to determine the location map (e.g., relative position of the wireless device 312 to the user). For example, the intersections of the radiuses forming the potential location areas 321, 333, 335 can be used to calculate the relative positions. The radiuses are an indication of the different absolute distances of the wireless device 312 and the user at different points in time (e.g., determined from signal strengths from wireless signals, such as BLE signals). As previously discussed, the precision of the map can improve with increased movement of the user.

Although the embodiment of FIG. 3 illustrates the user moving in an x direction and a wireless device 312, embodiments are not so limited. For example, the user may move in x, y, and/or z directions that is or is not a straight line. The path in the x, y, and/or z direction can be calculated by integrating location data (e.g., delta x, delta y, and delta z, as provided by an accelerometer) with signal strengths of wireless devices in the area. Further, a direction of interest can be derived from the orientation data. The location data and orientation data can be processed by a processor circuitry, such as a low power microcontroller. Additionally, multiple wireless devices can be present in an area.

Figure 4:
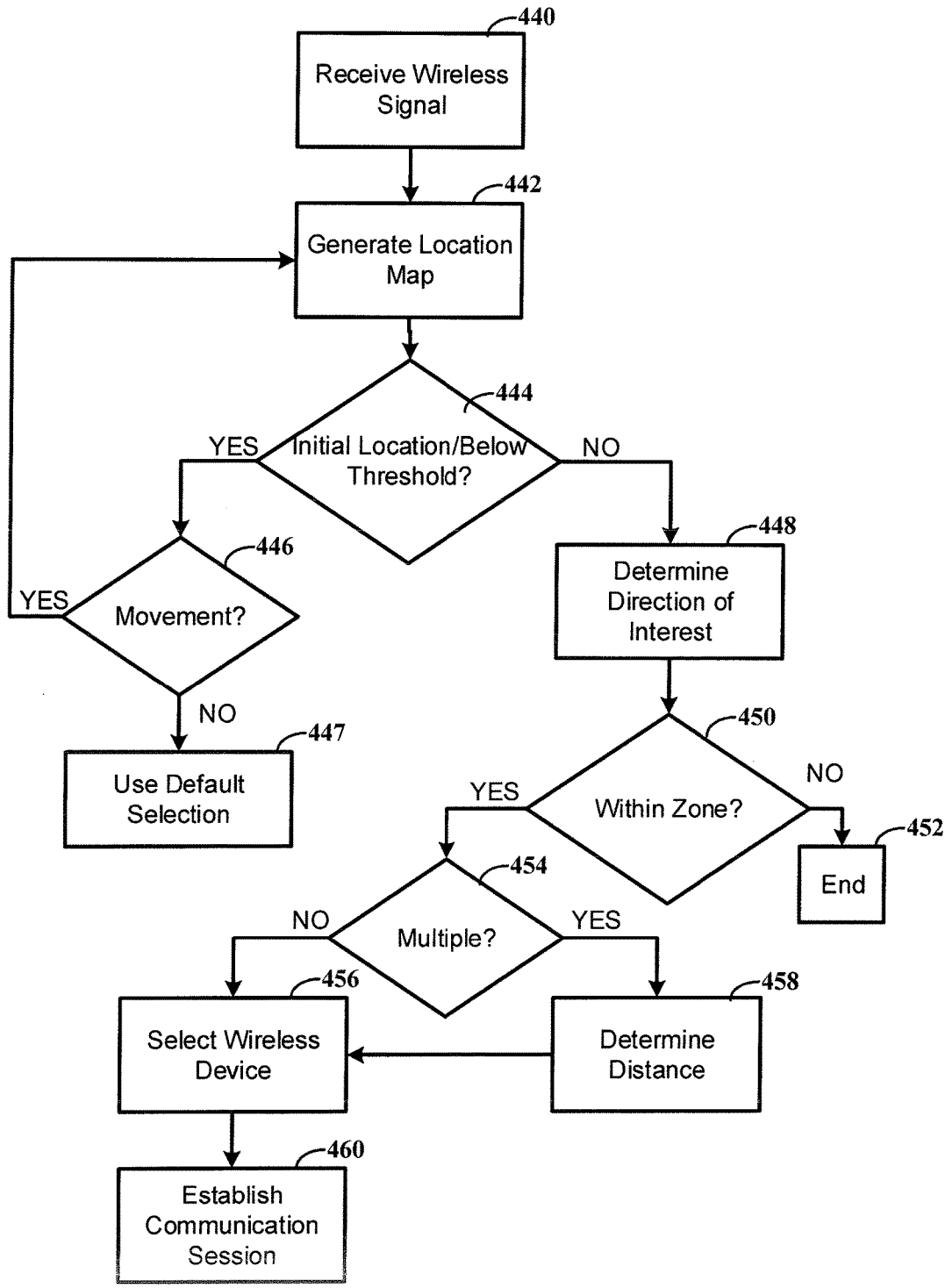
FIG. 4 shows a flow diagram of an example process for establishing communication between a user device and a selected wireless device, in accordance with various embodiments.

FIG. 4 shows a flow diagram of an example process for establishing communication between a user device and a selected wireless device, in accordance with various embodiments. The user device, in various embodiments, used to perform the process can include the system illustrated by FIG. 1 and/or the user device illustrated by FIG. 2.

At block 440, the process includes receiving, by a processor circuitry of a user device, a wireless signal from at least one wireless device. The processor circuitry can identify the wireless device in response to the wireless signal. At block 442, the processor circuitry can generate a location map based on the wireless signal and/or location data obtained by location circuitry of the user device. As previously discussed, in various embodiments, the location map and/or location data can be provided by another device.

The location map, in a number of embodiments, can be generated based on a plurality of wireless signals obtained after the user moves to multiple locations in the area, as illustrated by FIG. 3. For example, at block 444, the processor circuitry can determine if the location of the wireless device is an initial location and/or has a likelihood that is below a threshold. As an example, if one wireless signal has been received from the wireless device, the potential location area of the wireless device may have a likelihood that is a below a threshold (e.g., the location area has a likelihood of being accurate that is below a threshold.). In response to determining the location is below a threshold and/or is an initial location, the processor circuitry can determine if the user has moved, at block 446. For example, if the user has not moved, the processor circuitry, at block 447, can use a default selection. The default selection, in various embodiments, can include waiting for movement, providing an indication to the user to move, selecting all wireless devices identified, showing a list of all wireless devices identified, and a combination thereof. For example, using a display, a user can be instructed to move positions and provided with a list of identified wireless devices in the area. At block 442, in response to movement, the location map can be updated based on location data and signal strengths of wireless signals received from the at least one wireless device.

In response to determining the location of the wireless device is not an initial location and/or has a likelihood at and/or above the threshold, at block 448, the processor circuitry can determine the direction of interest using orientation data. At block 450, the processor circuitry can determine if there is a wireless device and/or a subset of wireless devices within a zone. The zone, as previously discussed, is determined based on the direction of interest and direction of interest parameters. If there are no wireless devices within the zone, the process can end at block 452. If there are at least one wireless device within the zone, at block 454, the processor circuitry can determine if there are multiple wireless devices within the zone. For example, at block 456, if one wireless device is within the zone, the wireless device is selected. By contrast, at block 458, if multiple wireless devices are within the zone, the processor circuitry can determine a relative distance of the user from the multiple wireless devices using the location map and/or based on signal strengths of wireless signals received. And, at block 456, the processor circuitry can select a wireless device from the multiple wireless devices based on the relative distance of the user from the multiple wireless devices. For example, the selected wireless device can have a lower distance from the user than the remaining multiple wireless devices (e.g., it is closer to the user than the remaining multiple wireless devices that are within the zone).

At block 460, the processor circuitry can establish communication with the selected wireless device. The established communication can, in various embodiments, include a communication session. For example, the selected wireless device can send information to the user device and/or the user device can be used to control operation of the selected wireless device.

Embodiments in accordance with the present disclosure can include methods with additional and/or fewer actions than illustrated by FIG. 4. For example, a method for selecting a wireless device to establish communication with can include obtaining orientation data indicative of a physical orientation of the user and obtaining location data indicative of a location of a user. Further, the method can include generating, using the processor circuitry, a location map of a plurality of other devices relative to at least one location of the user based on signal strengths of signals wirelessly received by the user device from the plurality of wireless devices and the location data. The processor circuitry can be used to determine a direction of interest using the orientation data, a subset of the plurality of wireless devices that are within a zone determined based on the direction of interest, and a relative distance of the user from the subset of the plurality of wireless devices using the location map. The method can further include selecting, using the processor circuitry, a wireless device among the subset of wireless devices based on the relative distance of the user from each of the subset of the plurality of wireless devices, and establishing communication with the selected wireless device using the user device.

Various blocks, modules or other circuits may be implemented to carry out one or more of the operations and activities described herein and/or shown in the figures. In these contexts, a "block" (also sometimes "circuitry", "logic circuitry", or "module") is a circuit that carries out one or more of these or related operations/activities (e.g., determine a direction of interest, select a wireless device, or establish communication). For example, in certain of the above-discussed embodiments, one or more modules are discrete logic circuits or programmable logic circuits configured and arranged for implementing these operations/activities, as in the circuit modules shown in FIG. 1. In certain embodiments, such a programmable circuit is one or more computer circuits programmed to execute a set (or sets) of instructions (and/or configuration data). The instructions (and/or configuration data) can be in the form of firmware or software stored in and accessible from a memory (circuit). As an example, first and second modules include a combination of a CPU hardware-based circuit and a set of instructions in the form of firmware, where the first module includes a first CPU hardware circuit with one set of instructions and the second module includes a second CPU hardware circuit with another set of instructions.

Certain embodiments are directed to a computer program product (e.g., nonvolatile memory device), which includes a machine or computer-readable medium having stored thereon instructions which may be executed by a computer (or other electronic device) to perform these operations/activities.

Based upon the above discussion and illustrations, those skilled in the art will readily recognize that various modifications and changes may be made to the various embodiments without strictly following the exemplary embodiments and applications illustrated and described herein. For example, the device can include a wearable device in communication with a mobile device. Such modifications do not depart from the true spirit and scope of various aspects of the invention, including aspects set forth in the claims.

What is claimed is:

1. A system for use by a user, the system comprising:
   a wearable electronic sensor that is configured and arranged to be disposed on a head of the user along a set direction with respect to the user, the wearable electronic sensor including orientation circuitry configured and arranged to obtain orientation data indicative of an orientation of the wearable electronic sensor in three-dimensional space and of a physical orientation of the user; and
   an electronic communication device coupled to the wearable electronic sensor, including:
      a communication circuit configured and arranged to wirelessly communicate data with a plurality of further wireless devices;
      processor circuitry configured and arranged to:
         generate and update, responsive to movement of the user, a location map of the plurality of further wireless devices relative to a location of the user based on strengths of wireless signals from the plurality of further wireless devices and the orientation data;
         determine a direction of interest of the user using the orientation data, the direction of interest substantially coinciding with the set direction;
         define a spatial zone surrounding the direction of interest, the spatial zone having a spatial projection along at least one of three mutually orthogonal directions;
         select a wireless device from the plurality of further wireless devices disposed within the spatial zone based on the direction of interest indicating a location of the user relative to the plurality of further wireless devices;
         automatically establish, without user input and in response to the selection of the selected wireless device, communication between the electronic communication device and the selected wireless device, commencing a communication session with the selected wireless device during which the electronic communication device controls the selected wireless device in response to user input and not establishing communication between the electronic communication device and the remaining of the plurality of further wireless devices, other than the selected wireless device.

2. The system of claim 1, wherein the processor circuitry is further configured and arranged to determine the spatial zone surrounding the direction of interest relative to the plurality of further wireless devices using the signal strengths of wireless signals received from the plurality of wireless devices and wherein the established communication includes receiving pushed information from the selected wireless device at the electronic communication device.

3. The system of claim 1, wherein the processor circuitry is further configured and arranged to:
   identify the plurality of further wireless devices when the user is at a first location in response to receiving wireless signals from the plurality of further wireless devices;
   generate the location map of the plurality of further wireless devices relative to the first location based on the strengths of the wireless signals; and
   automatically establish the communication between the electronic communication device and the selected wireless device without additional user input responsive to the selected wireless device from the plurality of further wireless devices being within the spatial zone surrounding the direction of interest.

4. The system of claim 3, wherein the system further includes location circuitry configured and arranged to obtain location data indicative of a location of the user, wherein the processor circuitry is further configured and arranged to:
   determine a likelihood that the user is moving to a second location based on the location data and signal strengths of additional received wireless signals from the plurality of further wireless devices when the user is at the second location,
   update the location map in response to the user moving to the second location with the system in response to the likelihood being outside a threshold,
   define the spatial zone using the location map, and
   not establish communication between the electronic communication device and the remaining of the plurality of further wireless devices, other than the selected wireless device.

5. The system of claim 1, wherein the wearable electronic sensor further includes an additional communication circuit and the electronic communication device is a mobile device including the processor circuitry,
   wherein the processor circuitry is configured and arranged to determine the direction of interest of the user using the orientation data based on where the user is looking.

6. The system of claim 5, wherein the wearable electronic sensor includes a microphone and the additional communication circuit is connected via a cable to the mobile device, the mobile device including the processor circuitry.

7. The system of claim 5, wherein the wearable electronic sensor includes a microphone, and the additional communication circuit that is further configured and arranged to communicate wirelessly with the mobile device and the plurality of further wireless devices.

8. The system of claim 1, wherein the direction of interest of the user is indicative of an orientation of the electronic communication device, and wherein the processor circuitry is configured and arranged to determine the spatial zone based on the direction of interest and at least one direction of interest parameter and select the wireless device that is within the spatial zone, and wherein the processor circuitry configured and arranged to control the selected wireless device in response to the user input further includes controlling functions selected from a group consisting of: a volume, a channel, lights on, lights off, a temperature, and a combination thereof.

9. The system of claim 8, wherein another wireless device of the plurality of further wireless devices is within the spatial zone with a larger distance from the user than the selected wireless device, wherein the processor circuitry is configured and arranged to selected the another wireless device as an alternative candidate.

10. The system of claim 1, wherein the processor circuitry is configured and arranged to select the wireless device of the plurality of further wireless devices without user input, and wherein the orientation circuitry includes a device selected from a group of devices consisting of a compass, a gyroscope, a gyrocompass, a magnetometer, an optical sensor, and a combination thereof.

11. The system of claim 1, further include a user interface configured and arranged with the processor circuity to communicate data to the user, the processor circuitry configured and arranged to provide identification of the selected wireless device to the user using the user interface; and
wherein the processor circuitry is further configured and arranged to adjust a volume of the spatial zone in response to another user input, the adjustment including a change in an x, y, and z projection that defines the spatial zone.

12. A system for use by a user, the system comprising:
orientation circuitry configured and arranged to obtain orientation data indicative of an orientation of the user in three-dimensional space, the orientation circuitry being part of a wearable electronic sensor configured and arranged to be disposed on a head of the user along a set direction;
an electronic communication device communicatively coupled to the orientation circuitry, the electronic communication device being configured and arranged to operate in different communication modes including a push mode in which information is pushed to the electronic communication device from other devices in response to establishing communication and including:
location circuitry configured and arranged to obtain location data indicative of a location of the user;
a communication circuit configured and arranged to wirelessly communicate data with a plurality of wireless devices; and
processor circuitry configured and arranged to process the orientation data and the location data and to:
determine the location of the user relative to the plurality of wireless devices based on wireless signals received by the processor circuitry from the plurality of wireless devices and the location data;
generate and update a location map over time, and in response to movement of the user, by integrating signal strengths of the wireless signals received from the plurality of wireless devices and the locations data, the location map being indicative of locations of the plurality of wireless devices relative to the user;
determine a direction of interest using the orientation data, the direction of interest substantially coinciding with the set direction;

define a spatial zone surrounding the direction of interest, the spatial zone having a spatial projection along at least one of three mutually orthogonal directions;
select a wireless device from the plurality of wireless devices based on the defined spatial zone, the selection being based on the location of the user relative to the plurality of wireless devices; and
automatically establish communication between the electronic communication device and the selected wireless device and commencing a communication session with the selected wireless device during the push mode, without user input and not establishing communication between the electronic communication device and the remaining plurality of wireless device, other than the selected wireless device in response to the selected wireless device being within the spatial zone surrounding the direction of interest.

13. The system of claim 12, further including:
the wearable electronic sensor including the orientation circuitry; and
wherein the electronic communication device is communicatively coupled to the wearable electronic sensor, wherein the processor circuitry is configured and arranged to generate the location map of locations of the plurality of wireless devices relative to at least one location of the user by integrating signal strength of wireless signals received from the plurality of wireless devices with the location data.

14. The system of claim 13, wherein,
the orientation circuitry is configured and arranged to obtain the orientation data based on where the user is looking.

15. The system of claim 12, wherein the location is determined based on a distance of the user from at least a subset of the plurality of wireless devices that are within the spatial zone, the spatial zone being based on the direction of interest and at least one direction of interest parameter, wherein the distance is determined based on an x, y, and z position of the user and a signal strength of wireless signals received from the at least a subset of the plurality of wireless devices.

16. The system of claim 15, wherein the processor circuitry is configured and arranged to adjust a volume of the spatial zone in response to a user input received.

17. A method of selecting a wireless device to establish communication with a system, the system for use by a user, comprising:
obtaining orientation data, using orientation circuitry, indicative of a physical orientation of a wearable electronic sensor, in three-dimensional space, the wearable electronic sensor disposed on a head of the user along a set direction with respect to the user;
obtaining location data, using location circuitry, indicative of a location of the user using a system, the system including processor circuitry and a communication circuit;
generating, using the processor circuitry, a location map of a plurality of wireless devices relative to at least one location of the user based on signal strengths of wireless signals received from the plurality of wireless devices and the location data; and
determining, using the processor circuitry:
a direction of interest of the user using the orientation data, the direction of interest substantially coinciding with the set direction;

a spatial zone surrounding the direction of interest, the spatial zone having a spatial projection along at least one of three mutually orthogonal directions;
a subset of the plurality of wireless devices disposed within the spatial zone;
a distance of the user from the subset of the plurality of wireless devices using the location map;
selecting, using the processor circuitry, a wireless device among the subset of the plurality of wireless devices based on the distance of the user from the subset of the plurality of wireless devices; and
automatically establishing communication with the selected wireless device, in response to the selection of the wireless device and without user input, using the processor circuitry and the communication circuit and commencing a communication session with the selected wireless device during which the processor circuitry controls the selected wireless device in response to user input, and wherein the processor circuitry is configured and arranged to control the selected wireless device in response to the user input further includes controlling functions selected from a group consisting of: a volume, a channel, lights on, lights off, a temperature, and a combination thereof.

18. The method of claim 17, wherein the method further includes the wearable electronic sensor communicating the orientation data to an electronic communication device of the system, the electronic communication device including the processor circuitry and the communication circuit, wherein the orientation data is indicative of a physical orientation of the user and a field of view of the user, and wherein the direction of interest of the user is indicative of an orientation of the electronic communication device, and wherein the processor circuitry is configured and arranged to determine the spatial zone based on the direction of interest and at least one direction of interest parameter and select the wireless device that is within the spatial zone.

19. The method of claim 17, the wearable electronic sensor including another communication circuit, the orientation circuitry, and the location circuitry, wherein the method further includes the wearable electronic sensor communicating the orientation data and the location data to an electronic communication device coupled to the wearable electronic sensor of the system, the electronic communication device including the processor circuitry.

20. The method of claim 17, wherein establishing the communication with the selected wireless device is responsive to the selection and without additional user input, the method furthering including adjusting the spatial zone in response to the user input, the adjustment including a change in an x, y, and z projection that defines the spatial zone.

* * * * *